Aug. 6, 1963    M. K. KAUSCHE    3,099,887
AUTOMATIC GATE
Filed Sept. 25, 1962    3 Sheets-Sheet 1
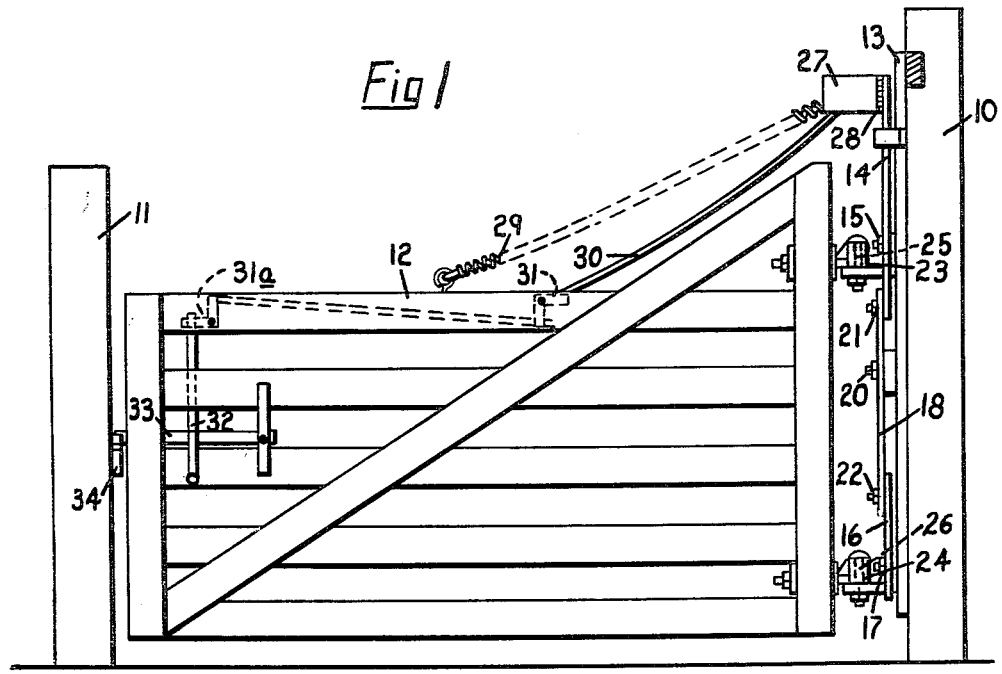
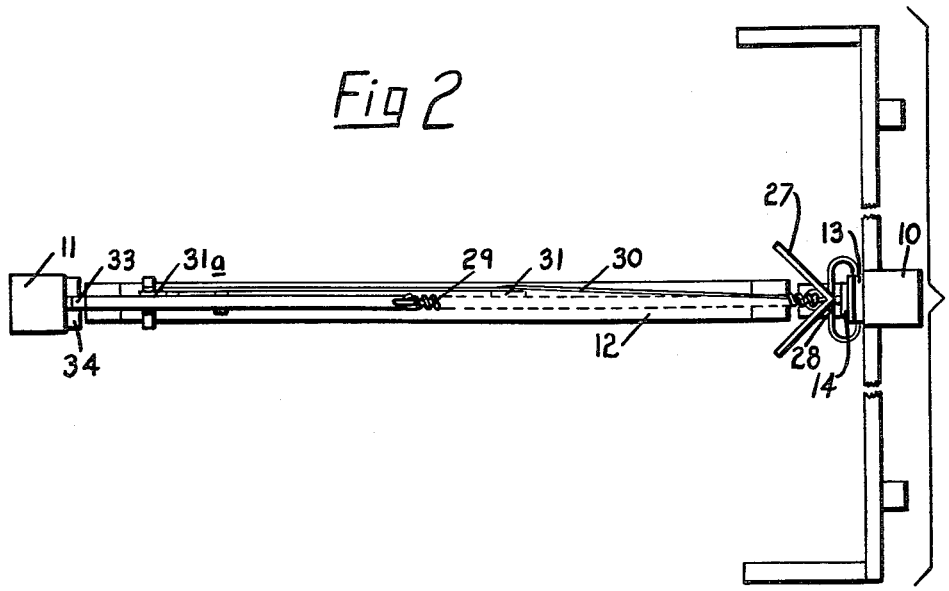
INVENTOR.
MERLE K. KAUSCHE
BY *Wells & St. John*
ATTYS.

Aug. 6, 1963  M. K. KAUSCHE  3,099,887
AUTOMATIC GATE
Filed Sept. 25, 1962  3 Sheets-Sheet 2
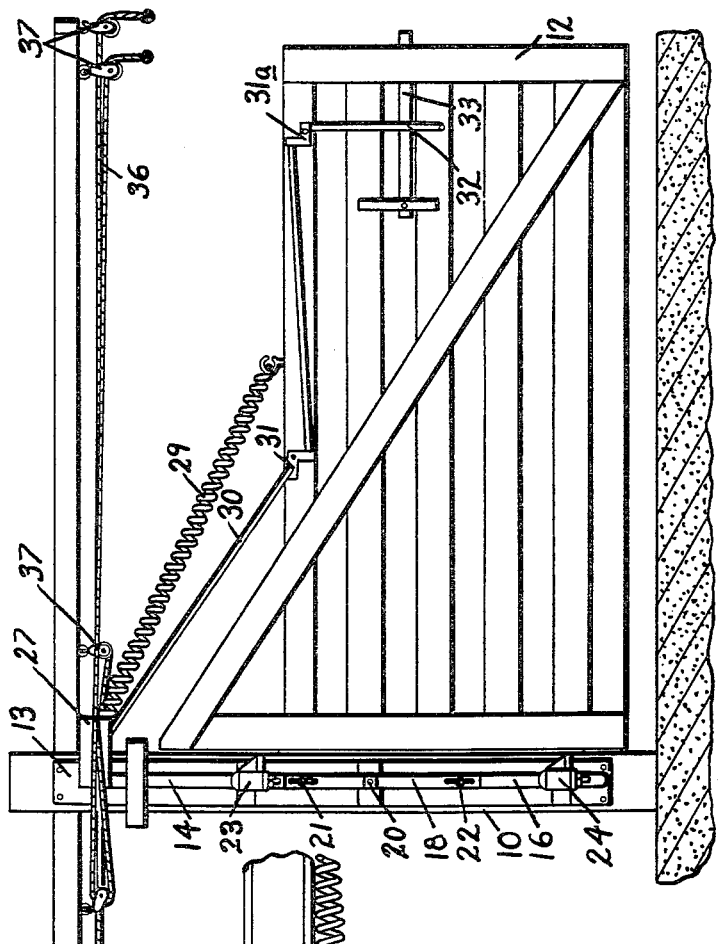
Fig 3
Fig 4
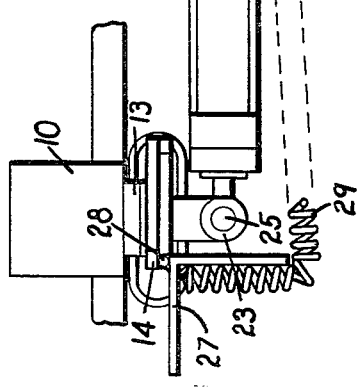
INVENTOR.
MERLE K. KAUSCHE
BY
ATTYS.

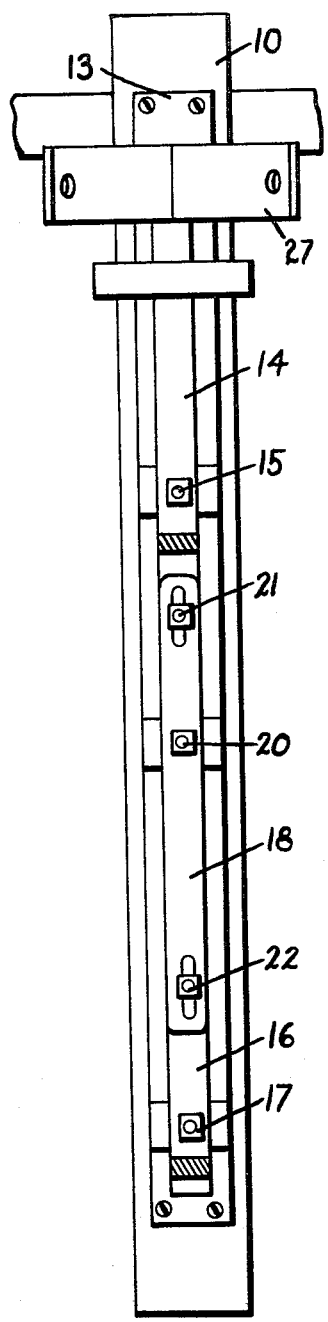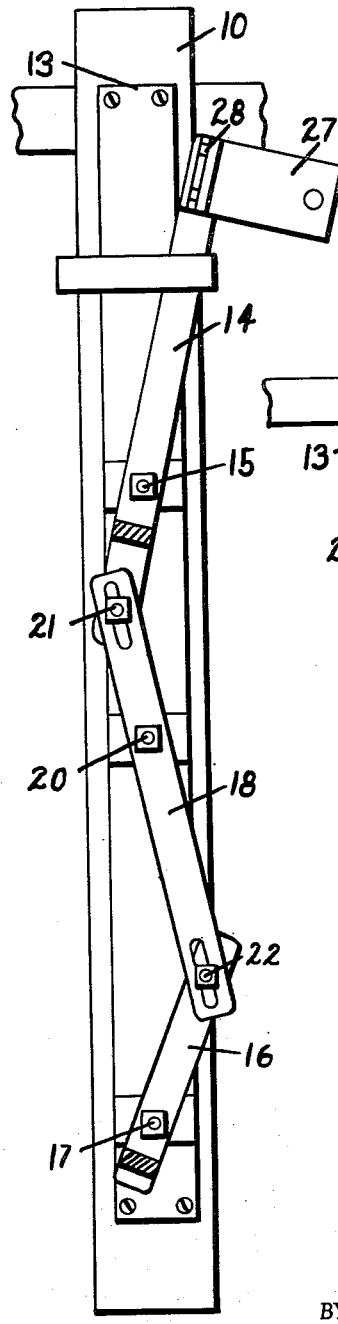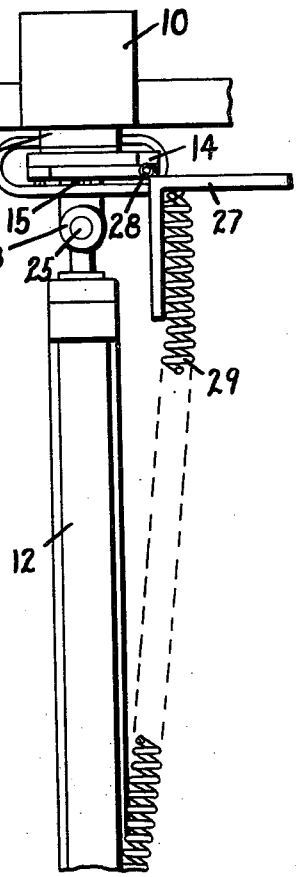

United States Patent Office 3,099,887
Patented Aug. 6, 1963

3,099,887
AUTOMATIC GATE
Merle K. Kausche, 10 N. Wilbur, Walla Walla, Wash.
Filed Sept. 25, 1962, Ser. No. 225,997
6 Claims. (Cl. 39—56)

This invention relates to an automatic gate adapted to be operated by means of cables or other devices manually controlled from a position remote from the actual gate itself.

The present invention is concerned with the construction and operation of a gate for a fence or other structure, which may be controlled remotely from the gate position. In particular, the device is adapted for use on gates across roads, allowing one to open the gate without actually approaching the gate. Such a gate is also useful when corralling cattle or other animals.

It is a first object of this invention to provide a gate which may be operated from a location beyond the opening radius of the gate so as to eliminate any obstruction with the gate operation by the user, or by animals in the vicinity of the user. This object is accomplished by providing a gate which may be controlled by cables extending outward any desired distance from the posts on which the gate is hung.

Another object of this invention is to provide such a gate mechanism which will automatically move the gate without causing the outer end of the gate to drag along the supporting ground surface.

Another object of this invention is to provide such a gate mechanism which may be readily installed on any existing gate structure to thereby convert the gate to an automatic operation.

Further objects will be evident from a study of the following description taken in conjunction with the accompanying drawings, which illustrate one preferred form of the invention. The specific details of this preferred form are exemplary but are not intended to limit or restrict the scope of the invention which is defined in the claims following this description.

In the drawings:

FIGURE 1 is a side view of the closed gate and supporting post taken through a plane directly adjacent the gate post;

FIGURE 2 is a top view of the gate seen in FIGURE 1, showing the post extensions broken away for purposes of composition;

FIGURE 3 is an elevation view looking toward the gate post, showing the gate in its fully opened position;

FIGURE 4 is an enlarged fragmentary top view of the fully opened gate showing the operating mechanism positioned to close the gate;

FIGURE 5 is an enlarged elevation view taken directly behind the gate hinges, looking toward the gate post and operating mechanism, showing the mechanism in its normal vertical position;

FIGURE 6 is a view similar to FIGURE 5, showing the operating mechanism when positioned to open or close the gate; and FIGURE 7 is a view similar to FIGURE 4, showing the closed gate with the operating mechanism positioned to open the gate.

The present invention is concerned with an automatic gate which may be controlled remotely without requiring any manual operation at the gate location. The gate is designed particularly for use across roads, in corrals or in other animal enclosures where a remotely operated gate is a convenient and effective way of controlling gate operation. A typical gate 12 is shown hanging from a gate post 10. The specific features of the gate 12 are immaterial to the present invention and are submitted merely as examples. The gate 12 spans the distance between the gate post 10 and the latch post 11 when in its fully closed position.

The operating mechanism with which the present invention is primarily concerned includes a vertical mounting plate 13 secured in any suitable manner upon the gate post 10. Mounting plate 13 carries a first lever 14 which is pivoted at 15 about a horizontal pivot axis. Below the first lever 14 is a second lever 16 which also is pivoted to the plate 13 about a horizontal axis designated by the numeral 17. Intermediate the first and second levers 14 and 16 is a third lever 18 pivoted to the plate 13 about a third vertically aligned horizontal pivot 20. The lever 18 connects levers 14 and 16 at connections 21 and 22 respectively. Each connection 21 and 22 is a slotted connection designed to allow for the radial movement of the three levers 14, 16 and 18. The pivot of each lever is vertically aligned with the pivot of each other lever so that each of the levers move in a definite relationship to the others governed by the length of the respective moment arms. It is important to note that the moment arm of the lowermost lever 16 is greater than that of the upper lever 14 and therefore the arm 16 will subtend a larger angle to the vertical than will the arm 14 in any given position of the three levers 14, 16 and 18.

Immediately below the pivot 15 of lever 14 is a fixed pin 25 which carries an upper hinge socket 23, mounted on the gate 12. A similar hinge pin 26 is fixed to the lever 16 immediately below its pivot 17 and carries a socket 24 also mounted on the gate 12. Each of these sockets 23 and 24 is pivotally carried by the gate 12 for slight rocking motion about a horizontal axis.

At the upper end of the lever 14, which extends above the top of the gate 12, is a bracket 27. The bracket 27 is illustrated as a right angle rigid bracket hinged at 28 to the lever 14 at its apex. The axis of hinge 28 is perpendicular to the axis of the pivot 15. The bracket 27 carries a spring 29 which extends from its apex downwardly to a hook 19 on the gate 12. The spring 29 overlaps the ends of the bracket 27 and may be abutted thereby, as may be seen in FIGURES 4 and 7. The purpose of the spring 29 is to move the gate 12 when the bracket 27 and lever 14 have been pulley to one side or the other about pivot 15 and hinge 28. A collar 25 is provided on the plate 13 in the path of movement of lever 14 about pivot 15 so as to limit the amount of angular motion possible by the lever 14. This construction can best be seen in FIGURES 5, 6 and 7.

In order to provide a self operating latch mechanism a cable 30 extends from the apex of bracket 27 downwardly to a crank 31 pivoted on the gate 12. The crank 31 operates a similar crank 31a which, when pulled to the right as seen in FIGURE 1, will lift the slide 32 and latch bar 33 to thereby release the gate from the latch receiver 34 fixed to the post 11. As may be seen in the drawings, turning the bracket 27 to either side will cause this lifting action due to the pulling of bracket 27 on the latch cable 30.

The operation of the gate is very simple and may be looked upon as a two step operation. Initially when the gate is closed, one desiring to open the gate will pull on the opposite side of bracket 27 so that the bracket 27 will attain the position illustrated in FIGURES 6 and 7. This will cause the levers 14 and 16 to be tilted slightly about their respective pivots 15 and 17 and thereby attain the position shown in FIGURE 6. In this position the lower hinge socket 24 is shifted to the side slightly beyond the upper hinge socket 23 and each is pivoted slightly from the vertical. Thus there is a tendency in the gate to swing to the right, as seen in FIGURE 6, due to its own weight. This tendency is buttressed by the fact that the spring 29 is now pulling from the right, as may be seen in FIGURE 7, due to the displacement of its connection with bracket 27.

This is increased due to the engagement of the side of bracket 27 to shorten the effective length of spring 29. The gate 12 will then begin to swing open and as this occurs, the bracket 27 is allowed to freely return to its normal position, as shown in FIGURE 5, by aligning the hinge sockets 23 and 24 about their normal vertical axis.

The spring 29 will continue the motion of gate 12, once begun, due to the fact that it is offset to one side in relation to the axis of the gate hinges. The gate will attain a stable fully opened position and will be maintained open, due to the tension of spring 29.

The gate is closed by the opposite action. The bracket 27 is pulled to the other side, as may be seen in FIGURE 4, and thereby shifts the effective anchor of spring 29 to a position outside the hinge axis of gate 12 so that the spring 29 tends to close the gate. Again the motion of the gate 12 will be continued after allowing the bracket 27 to center, due to the tendency of spring 29 to reach a dead center position relative to the gate 12 and hinge brackets 23 and 24.

The remote operation of the gate is attained by means of cables 36, which are strung along extensions 31 fixed to the gate post 10. The cables 36 are guided through pulley 37. It appears obvious that the gate may be operated from either or both sides of the gate post 10 by providing the necessary pulleys. In this manner the bracket 27 may be pulled to either side by a person standing at either side of the gate. The bracket 27 is illustrated so as to move the gate in either direction and requires at least two cables 36. One of these cables 36 must be fixed to one end of the bracket 27 and the other must be fixed to the other end of the bracket 27 so as to enable the user to pull the bracket 27 in either direction.

The above description is concerned with one specific example of my invention. However, other modifications may be readily discernible by one skilled in this field and therefore I do not intend that this specific detailed should limit or restrict the scope of my invention except as it is defined in the claims which follow.

Having thus described my invention, I claim:

1. A gate operating mechanism comprising:
    a gate;
    a vertical gate post;
    hinge means operatively connected between said gate post and said gate adapted to permit swinging motion of said gate in a horizontal direction;
    a first lever pivotally mounted on the face of said gate post carrying said hinge means, said first lever being pivotally mounted about a horizontal axis parallel to the closed position of said gate;
    a bracket pivotally connected to said first lever about an axis perpendicular to the pivotal axis of said first lever on said gate post, the bracket being longitudinally spaced along said lever from its pivotal axis on said gate post;
    a tension spring connected between said bracket adjacent its connection to said first lever, and said gate and overlapping the outer end of said bracket so as to be abutted thereby;
    and fixed means on said post located in the path of movement of said first lever adapted to limit pivotal motion thereof.

2. The device as defined in claim 1 wherein said hinge means comprises:
    a second lever pivotally mounted on said gate post face below said first lever, said second lever being pivotally carried about an axis parallel to that of said first lever;
    a third lever pivotally connecting said two levers and carried on said gate post for motion about a third parallel axis, the lever arm connecting said third lever and said second lever being greater than that connecting said first lever and said third arm;
    a pair of hinge pins fixed to said first lever and second lever below their respective pivotal connections to said gate post;
    and hinge sockets mounted on said hinge pins and pivotally carried by said gate for rotation about axes perpendicular to the respective hinge axes.

3. The device as defined in claim 1 wherein said bracket comprises:
    an angular rigid member having symmetrical sides, the apex of said member being hinged to said first lever;
    said spring being joined to said bracket at the interior corner of said apex so as to be alternately abutted by either side of said member.

4. A gate operating mechanism, comprising:
    a gate;
    a vertical gate post;
    a first lever pivotally mounted on said gate post about a horizontal pivot axis, said lever having a hinge pin fixed thereto below said pivot axis and a bracket pivoted thereto about an axis perpendicular to said pivot axis and located at the upper end of said lever;
    a second lever pivotally mounted on said gate post about an axis parallel to said pivot axis, said second lever being spaced vertically below said first lever and having a hinge pin fixed thereto below its axis;
    a third lever pivotally mounted on said gate post intermediate said first and second levers about an axis parallel to said pivot axis, said third lever having its respective ends operatively connected to said first and second levers;
    a pair of hinge sockets carried within said hinge sockets and pivotally mounted along one edge of said gate about horizontal axes;
    a tension spring extending from said bracket adjacent its pivotal connection to said first lever and said gate adapted to be abutted by the outer end of said bracket;
    and means operatively connected to said bracket adapted to draw said bracket against said spring by pivoting said bracket about its pivotal axis on said first lever.

5. A device as defined in claim 4 further comprising: limit means fixed to said gate post above the pivot axis of said first lever adapted to limit motion of said first lever about said pivot axis.

6. A device as defined in claim 4 wherein said levers are pivotally mounted on a removable mounting plate fixed to said gate post.

References Cited in the file of this patent

UNITED STATES PATENTS

| | | |
|---|---|---|
| 2,062,738 | Bigler | Dec. 1, 1936 |
| 2,803,898 | Hancock | Aug. 27, 1957 |
| 3,059,358 | Nogic | Oct. 23, 1962 |